United States Patent
Yang

(10) Patent No.: US 10,039,096 B2
(45) Date of Patent: Jul. 31, 2018

(54) SYSTEM AND METHOD FOR PROTECTING TIME SLOTS

(71) Applicant: Futurewei Technologies, Inc., Plano, TX (US)

(72) Inventor: Yunsong Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 64 days.

(21) Appl. No.: 15/169,186

(22) Filed: May 31, 2016

(65) Prior Publication Data

US 2017/0347347 A1    Nov. 30, 2017

(51) Int. Cl.
*H04W 72/04* (2009.01)
*H04W 72/12* (2009.01)
*H04W 84/12* (2009.01)

(52) U.S. Cl.
CPC ....... *H04W 72/044* (2013.01); *H04W 72/121* (2013.01); *H04W 72/1289* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2014/0254426 A1* | 9/2014 | Abraham | H04W 48/10 370/254 |
| 2015/0081840 A1* | 3/2015 | Patil | H04L 67/28 709/217 |
| 2015/0098388 A1* | 4/2015 | Fang | H04W 48/16 370/328 |
| 2016/0198327 A1* | 7/2016 | Park | H04W 8/005 370/330 |
| 2016/0278086 A1* | 9/2016 | Du | H04W 56/0015 |

OTHER PUBLICATIONS

"IEEE Standard for Information technology—Telecommunications and information exchange between systems Local nd metropolitan area networks—Specific requirements, Part 11: Wireless LAN Medium Access Control (MAC) and hysical Layer (PHY) Specifications," IEEE Computer Society, IEEE Std 802.11TM-2012, Mar. 29, 2012, 2,793 pages.
"Neighboring Awareness Networking Technical Specification Version 1.0", Wi-Fi Alliance, May 1, 2015, 98 pages.

* cited by examiner

*Primary Examiner* — Brian Roberts
(74) *Attorney, Agent, or Firm* — Slater Matsil, LLP

(57) ABSTRACT

A method for prioritizing first group devices over second group devices in accessing a channel during a time slot scheduled for communications by the first group devices is provided. The method includes generating a frame comprising a Duration field containing a value set to a sum of a duration of a frame exchange including a transmission of the frame and a duration of a time extension, and transmitting the frame in the time slot.

26 Claims, 9 Drawing Sheets

600

| FIELD | SIZE (OCTETS) | VALUE | DESCRIPTION |
|---|---|---|---|
| ATTRIBUTE ID | 1 | TBD | IDENTIFIES THE TYPE OF NAN ATTRIBUTE |
| LENGTH | 1 | VARIABLE | LENGTH OF THE FOLLOWING FIELDS IN THE ATTRIBUTE |
| DURATION_EXTENSION | 1 | VARIABLE | |
| INITIAL NDL-ID | 1 | VARIABLE | STARTING OFFSET |
| NDL-ID BITMAP | VARIABLE | VARIABLE | BITMAP FOR THE DEVICES THAT ARE PAGED |

| FIELD | SIZE (OCTETS) | VALUE | DESCRIPTION |
|---|---|---|---|
| ATTRIBUTE ID | 1 | TBD | IDENTIFIES THE TYPE OF NAN ATTRIBUTE |
| LENGTH | 1 | VARIABLE | LENGTH OF THE FOLLOWING FIELDS IN THE ATTRIBUTE |
| DURATION_EXTENSION | 1 | VARIABLE | |
| LIST OF NMSG-MA | VARIABLE | VARIABLE | LIST OF THE NMSG-MAS THAT ARE BEING PAGED |

*Fig. 7*

SYSTEM AND METHOD FOR PROTECTING TIME SLOTS

TECHNICAL FIELD

The present invention relates to digital communications, and, in particular embodiments, to a system and method for protecting time slots.

BACKGROUND

In a communications system based on IEEE 802.11 (or also widely known as Wi-Fi), both physical and virtual carrier sensing (CS) functions are used to determine the state of the medium (i.e., the channel). When either function indicates a busy channel, the channel is considered busy; otherwise, it is considered idle. A physical CS function is based on comparing the energy detected on the channel and a detection threshold that is pre-specified per frequency band and channel bandwidth. A virtual CS function is provided by the medium access control (MAC) layer of IEEE 802.11 compliant communications systems using a network allocation vector (NAV). The virtual CS function indicates the state, e.g., idle or busy, of a channel. The NAV is an indicator that is maintained by each Wi-Fi station and access point (AP) of time periods when transmissions onto the channel is not to be initiated by the station or AP. Any station or AP receiving a valid frame where a value in an Address 1 field (also known as the Receiver Address (RA) field) in the MAC header of the frame is not the MAC address of the station or AP should update its NAV with the value received in the Duration field of the MAC header of the frame. The NAV may be thought of as a counter that counts down to 0 at a uniform rate. When the NAV reaches 0, the virtual CS function indicates that the channel is idle and when the NAV is nonzero, the virtual CS function indicates that the channel is busy. When the channel is busy, the channel cannot or should not be accessed.

SUMMARY

Example embodiments provide a system and method for protecting time slots.

In accordance with an example embodiment, a method for prioritizing first group devices over second group devices in accessing a channel during a time slot scheduled for communications by the first group devices is provided. The method includes generating, by one of the first group devices, a frame comprising a Duration field containing a value set to a sum of a duration of a frame exchange including a transmission of the frame and a duration of a time extension, and transmitting, by the one of the first group devices, the frame in the time slot.

In accordance with an example embodiment, a method for accessing a channel for communicating in a time slot is provided. The method includes receiving, by a device, a frame in the time slot, the frame comprising a Duration field containing a value set to a sum of a duration of a frame exchange including a transmission of the frame and a duration of a time extension, updating, by the device, a network allocation vector (NAV) in accordance with the value of the Duration field and the time extension, and contending, by the device, for access to the channel when a channel access control indicates that the channel is idle.

In accordance with an example embodiment, a first group device adapted to prioritize first group devices over second group devices in accessing a channel is provided. The first group device includes a processor, and a computer readable storage medium storing programming for execution by the processor. The programming including instructions to configure the first group device to generate a frame comprising a Duration field containing a value set to a sum of a duration of a frame exchange including a transmission of the frame and a duration of a time extension, and transmit the frame in a time slot.

In accordance with an example embodiment, a device adapted to access a channel for communicating in a time slot is provided. The device includes a processor, and computer readable storage medium storing programming for execution by the processor. The programming including instructions to configure the device to receive a frame in the time slot, the frame comprising a Duration field containing a value set to a sum of a duration of a frame exchange including a transmission of the frame and a duration of a time extension, update a NAV in accordance with the value of the Duration field and the time extension, and contend for access to the channel when a channel access control indicates that the channel is idle.

Practice of the foregoing embodiments enables a prioritizing of devices belonging in a first group over devices belonging in a second group. The prioritizing occurs during a time slot intended for communications by devices belonging in the first group.

BRIEF DESCRIPTION OF THE DRAWINGS

For a more complete understanding of the disclosure, and the advantages thereof, reference is now made to the following description taken in conjunction with the accompanying drawings, in which:

FIG. 6 illustrates a table detailing modifications to the Paging Attribute for unicast data according to embodiments presented herein;

FIG. 7 illustrates a table detailing modifications to the Paging Attribute for multicast data according to embodiments presented herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
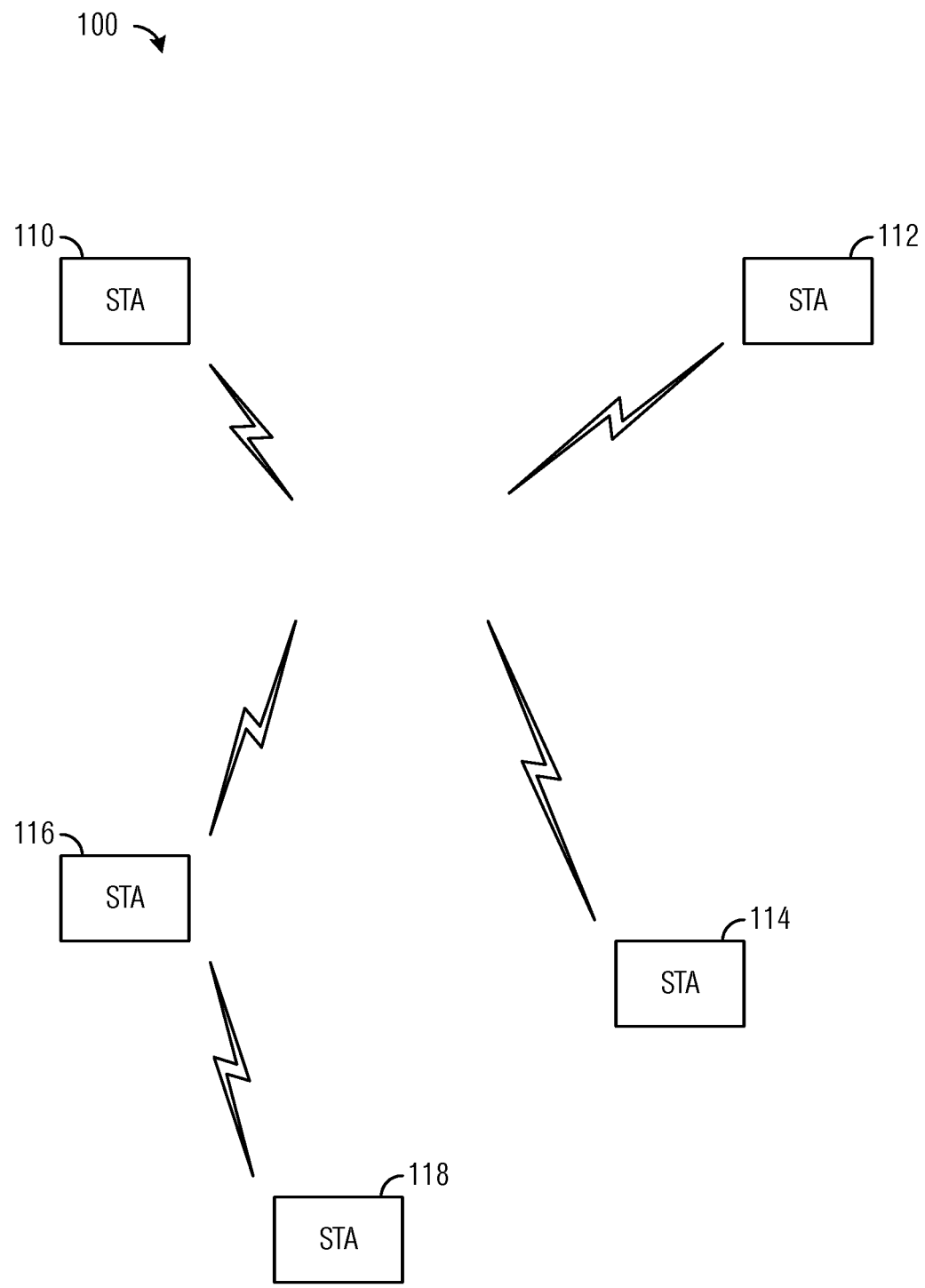
FIG. 1 illustrates an example communications system.

FIG. 1 illustrates an example communications system 100. Communications system 100 includes a plurality of stations (STAs), such as STA 110, STA 112, STA 114, STA 116, and STA 118. A STA may also be commonly referred to as a user equipment (UE), a mobile station, a mobile, a user, a subscriber, a terminal, a device, a communications device, and the like. In communications system 100, a first STA may transmit a frame directly to a second STA without going through a centralized entity such as an access point. While it is understood that communications systems may employ any number of STAs, only five STAs are illustrated for simplicity.

As stated before, one objective that the Wi-Fi Alliance is trying to achieve with the neighbor awareness networking (NAN) Release 2 (NAN2) program is to provide proximity based device-to-device data connectivity with low power consumption. Therefore, a power saving mechanism for channel access during the NAN2 data operation is needed.

Two options are being considered for NAN2 data operation:
Paged NAN data link (P-NDL); and
Synchronized NAN data link (S-NDL).

Figure 2:
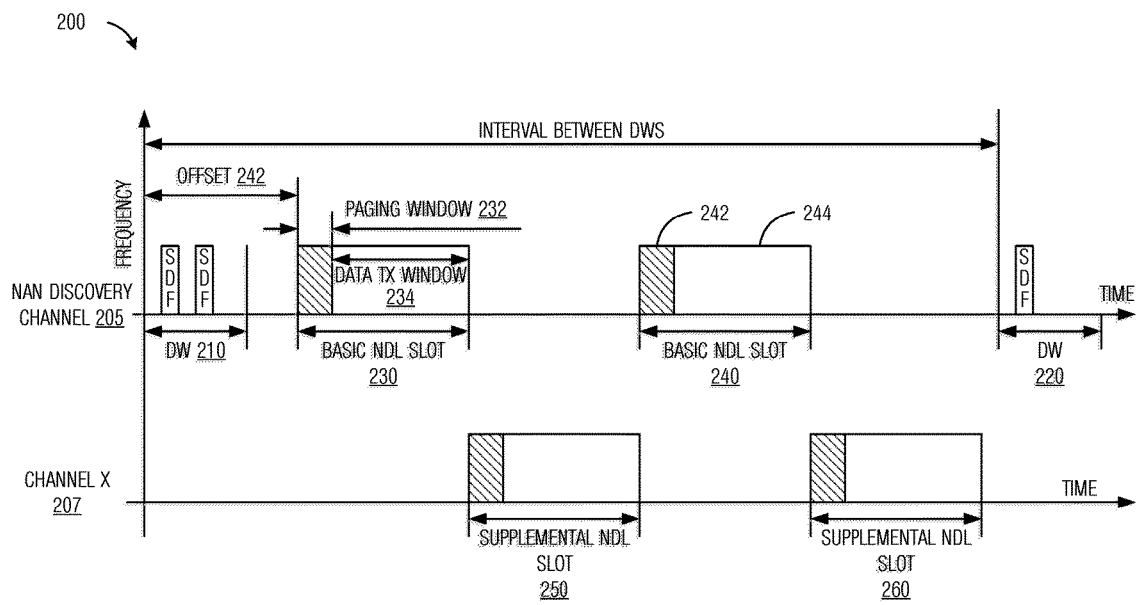
FIG. 2 illustrates an example operation of NAN discovery and P-NDL, wherein a sequence of NAN Discovery Windows (DWs) is used for NAN discovery and a sequence of P-NDL Slots are used for NAN data link.

FIG. 2 illustrates an example operation 200 of NAN discovery and P-NDL, wherein a sequence of NAN Discovery Windows (DWs) is used for NAN discovery and a sequence of P-NDL Slots are used for NAN data link. In order to enable NAN devices to discover a service or be discovered, a sequence of NAN Discovery Windows (DWs) with a fixed interval in between, such as DW 210 and DW 220 as shown in FIG. 2, are provisioned on a NAN Discovery Channel 205 using the synchronization mechanism specified in the Wi-Fi Alliance NAN Release 1 (NAN1) Technical Specification. As an example, the NAN Discovery channel on the 2.4 GHz band is the IEEE 802.11-defined Channel 6. A NAN device may contend for the NAN Discovery channel during a DW for sending a Service Discovery frame (SDF) in order to publish or subscribe a service.

In order to facilitate power efficient communication between devices, one or more Basic NDL Slots, such as Basic NDL Slot 230 and Basic NDL Slot 240 as shown in FIG. 2, are provisioned on NAN Discovery Channel 205 between two consecutive DWs, where two or more NAN devices may rendezvous. A Basic NDL Slot may be used for exchanging management messages, such as messages related to group formation, data link setup and parameters negotiation, allocation of Supplemental NDL Slot(s), channel switch announcement, authentication, security key distribution, association request, association response, de-authentication, de-association, and the like. A Basic NDL Slot may also be used for exchanging data. Different Basic NDL Slots may be used to serve different services or categories of services, respectively. Alternatively, one Basic NDL Slot may be used to serve different services or categories of services. One service may use multiple Basic NDL Slots.

The time offset from the beginning of the DW to the beginning of the first Basic NDL Slot within the same DW Interval, e.g., an offset 242, may be algorithmically derived from a parameter, such as a parameter of a NAN cluster, a NAN data group, a service or a category of services that the Basic DNL Slot supports, or a combination thereof. Therefore, the parameter may be a NAN cluster identifier (ID), a NAN data group ID, a service name, a hash of a service name, a service ID, a service category, or a combination thereof. A subsequent Basic NDL Slot serving the same service or category of services may be a fixed and pre-specified interval later. Alternatively, the time offset from the beginning of the DW to the beginning of the first Basic NDL Slot within the same DW Interval may be determined by the corresponding service publisher and announced during the DW when the service publisher is advertising the service. However, it may be desirable to avoid or to minimize the signaling overhead required to operate a Basic NDL Slot.

When the allocation of Basic NDL Slot(s) is not sufficient for the data traffic of a particular service or a particular NAN device participating in the data group, additional Supplemental NDL Slot(s), such as Supplemental NDL Slot 250 and Supplemental NDL Slot 260 in FIG. 2, may be provisioned. The Supplemental NDL Slots may be allocated on the NAN Discovery channel or other Wi-Fi frequency channels (such as Channel X 207 in FIG. 2). The messages for allocating Supplemental NDL Slot(s) may be conveyed using the Basic NDL Slots. This will allow much greater flexibility for allocating the time and frequency resources for the Supplemental NDL Slots and for negotiating other parameters, such as access related parameters, security related parameters, and the like, for operating the Supplement NDL Slots. It may be undesirable to convey the messages for allocating the Supplemental NDL Slot(s) during the DWs, as they may jam the channel during the DWs and compromise the performance for system synchronization and for service discovery, which are the two primary purposes of the DWs.

The design of a combination of Basic NDL Slots, which use a simple allocation scheme with low or no signaling overhead, and the optional Supplemental NDL Slots, which offer much greater flexibility and are allocated only when needed, helps to meet the needs of a wide variety of real-world usage scenarios for NAN2 data communications.

As shown in FIG. 2, each Basic NDL Slot (such as Basic NDL Slot 240) and Supplemental NDL Slot (such as Supplemental NDL Slot 250) has the same structure, which consists of a Paging Window (such as Paging Window 232) and a Data Transmission (Tx) Window (such as Data Transmission Window 234) in that order. In order to save power, a STA may enter a power saving mode after the DW. However, all STAs wake up during the Paging Windows of their associated Basic NDL Slot(s), and of their associated Supplemental NDL Slot(s) (if there are any), in order to transmit or receive a paging message.

A page message in a Paging Window is used by a data source STA (i.e., a STA transmitting data) to inform one or more target data sink STAs (i.e., STAs targeted for receiving the data) of a pending data transmission during a Data Transmission Window (such as Data Transmission Window 234) immediately following the Paging Window (such as Paging Window 232). A page message includes an identifier of each target data sink STA or a group identifier that identifies a group of target data sink STAs. If a STA doesn't receive any page message targeted for it (or for its group) during a Paging Window, it may enter a power saving mode at the end of the Paging Window until the next associated Paging Window (of an associated Basic NDL Slot and/or an associated Supplemental NDL Slot) or the next DW, whichever comes first, as the STA is not expecting to receive any data during the Data Transmission Window immediately following the Paging Window (in which it did not receive a page message targeted for it).

A STA successfully receiving a page message targeted for it or for its group during a Paging Window may transmit a Paging Acknowledgement (PA) frame back to the corresponding source STA within a pre-specified short interval (such as a short inter-frame space (SIFS) defined in the IEEE 802.11 Standards) in the same Paging Window. A source STA that has sent a page message during a Paging Window but has not received a corresponding PA frame within the pre-specified short interval may enter a power saving mode at the end of the Paging Window until the next associated Paging Window (of an associated Basic NDL Slot and/or an associated Supplemental NDL Slot) or the next DW, whichever comes first, as the source STA may determine that there is no sink STA in the proximity to receive the data, therefore, that there is no need to transmit the data.

A NAN2 device having buffered data for other NAN2 devices sends a page message to the target devices during a Paging Window, wherein the former device is referred to as a data source device and the targeted devices are referred to as data sink devices. The page messages are NAN Action frames (NAF) carrying Paging Attributes. The page messages comprise the MAC addresses/identifiers of the data sink devices. The page messages carry the highest Access Category (AC) of the buffered data, meaning that the channel access priority for transmitting the page messages are determined by the highest AC of the buffered data.

Each NAN2 device that was listed as a data sink device in a page message sends a trigger frame (e.g., a Quality of Service (QoS) NULL data frame) to the data source device and remains awake to receive data. The trigger frame may be unicast or multicast. During the Data Transmission Window (TxW), a data source device sends buffered data to the data sink device(s) from which the data source device has received trigger frame(s). The NAN2 devices that were not listed in a page message received during the Paging Window may enter a power saving node during the TxW associated with the Paging Window.

S-NDL features time-slot based low duty cycle operation similar to that of P-NDL with the exception that each basic NDL slot in S-NDL contains only a data transmission window and no Paging Window.

Co-assigned U.S. patent application Ser. No. 15/092,471, entitled "Method and System for Transmitting Data among Peer Stations in a Decentralized Manner with High Channel Efficiency", filed Apr. 6, 2016, which is hereby incorporated herein by reference provides a detailed description of NAN2 operation and data communications between peer stations.

Figure 3:
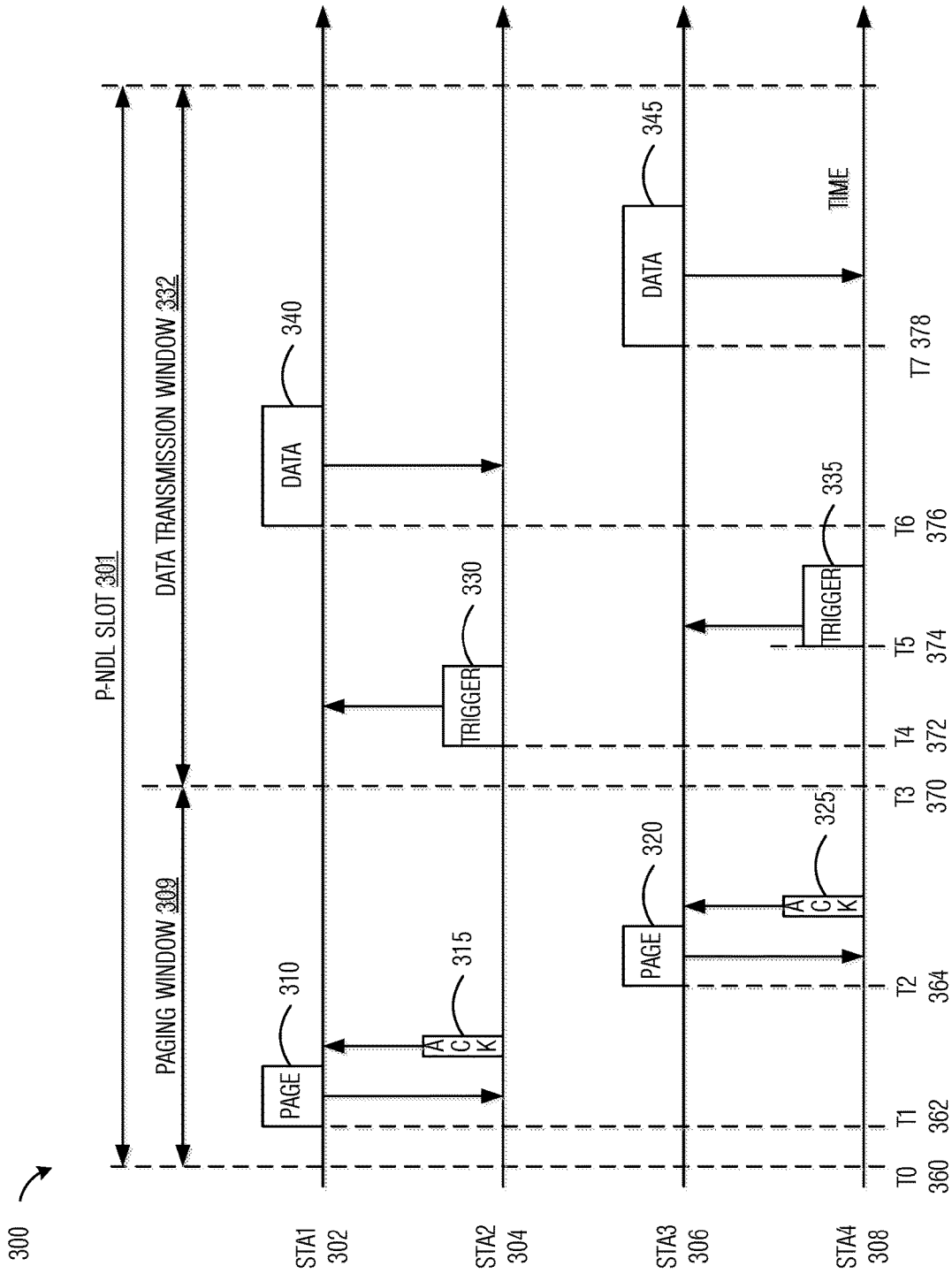
FIG. 3 illustrates example operations occurring during a P-NDL Slot, which may be an example of Basic NDL Slot and Supplemental NDL Slot shown in FIG. 2.

FIG. 3 illustrates example operations 300 occurring during a P-NDL Slot 301, which may be an example of Basic NDL Slot 230 and Supplemental NDL Slot 250 shown in FIG. 2. Operations 300 may be indicative of operations occurring in one or more STAs as the STAs participate in direct STA-to-STA communications. As shown in FIG. 3, at time T0 360, which marks the beginning of the Paging Window 309 of the NDL slot 301, a plurality of STAs, such as STA1 302, STA2 304, STA3 306, and STA4 308, wake up. STA1 302 has a data (such as DATA 340) to be sent to STA2 304 and STA3 306 has a data (such as DATA 345) to be sent to STA4 308. Thus, STA1 302 generates a page message (such as PAGE 310) including an identifier of STA2 304. Similarly, STA3 306 generates a page message (such as PAGE 320) including an identifier of STA4 308.

The generation of page message PAGE 310 and PAGE 320 trigger STA1 302 and STA3 306, respectively, to start a channel contention procedure by initiating a random value on a backoff (BO) timer, detecting if the channel has been idle for a time period that equals to a distributed inter-frame space (DIFS) as defined in the IEEE 802.11 Standards, and counting down the backoff timer at a uniform rate after detecting that the channel has been idle for a period of a DIFS. At time T1 362, the backoff timer of STA1 302 reaches zero first and STA1 302 transmits PAGE 310. STA3 306 detects that the channel becomes busy (e.g., the physical CS function of STA3 306 detects an energy above the detection threshold) and suspends counting down of its backoff timer.

STA2 304 receives PAGE 310 successfully, and then STA2 304 may transmit an ACK frame (such as ACK 315) to STA1 302 after waiting for a short inter-frame interval (SIFS) as defined in the IEEE 802.11 Standards. In order for STA3 306 to resume counting down its backoff time, STA3 306 needs to detect that the channel has been idle for a DIFS period again. STA3 306 can't resume counting down its backoff timer during the idle period that is between PAGE 310 and ACK 315 because a SIFS is shorter than a DIFS. The transmission of ACK 315 by STA2 304 resets STA3's 306 attempt of detecting that the channel has been idle for a DIFS period. Finally, at time T2 364, STA3 306 counts down its backoff timer to zero and transmits PAGE 320. STA4 308 receives PAGE 320 successfully, and then waits for a SIFS period before transmitting an ACK frame (such as ACK 325) to STA3 306.

At time T3 370, which marks the beginning of Data Transmission Window 332 of the same P-NDL slot 301, in order to indicate to its data source STA (i.e., STA1 302 and STA3 306, respectively) that it is ready to receive its data, each of STA2 304 and STA4 308 starts a channel contention procedure by initiating a random value on its backoff timer, detecting if the channel has been idle for a DIFS period, and counting down the backoff timer at a uniform rate after detecting that the channel has been idle for a period of a DIFS. At time T4 372 in the particular example illustrated in FIG. 3, STA2 304 wins the channel contention and transmits Trigger frame 330. STA4 308 detects that the channel becomes busy and suspends counting down of its backoff timer. Eventually, at time T5 374, STA4 308 counts down its backoff timer to zero and transmits Trigger frame 335. After receiving the Trigger frame (Trigger frames 330 and 335, respectively) from its data sink STA (STA2 304 and STA4 308, respectively), each of STA1 302 and STA3 306 sends an ACK frame back to its data sink STA, respectively. These two ACK frames are omitted in FIG. 3 to maintain simplicity. Then, each of STA1 302 and STA3 306 starts a second channel contention procedure similar to the one described before. At time T6 376, STA1 302 transmits Data 340 and at time T7 378, STA3 306 transmits Data 345. After receiving its data frame (Data 340 and 345, respectively), each of STA2 304 and STA4 308 sends an ACK frame back to its data source STA, STA1 302 and STA3 306, respectively. These two ACK frames are also omitted in FIG. 3 to maintain simplicity.

NAN2 devices are expected to work in various high-density Wi-Fi environments where there may be many non-NAN2 Wi-Fi devices operating in the general proximity. These non-NAN2 Wi-Fi devices may also contend for the same channel during a paging window in order to transmit their own data. During a paging window, a non-NAN2 Wi-Fi device may, on occasion, win channel contention and is able to transmit its data. The data transmission may be so extensive that it takes up a large portion of the remaining paging window, leaving little to no room for NAN2 devices to send page messages. If no page messages are sent in the paging window, no NAN2 data will be sent during the data transmission window immediately following the paging window, resulting in the data transmission window being significantly under-utilized for NAN2 data traffic. As a result, more P-NDL time slots will need to be allocated to satisfy the same QoS requirements for the NAN2 data. Allocating more P-NDL time slots means that the NAN2 devices need to wake up more often, thereby consuming more power, which is undesirable.

Figure 4:
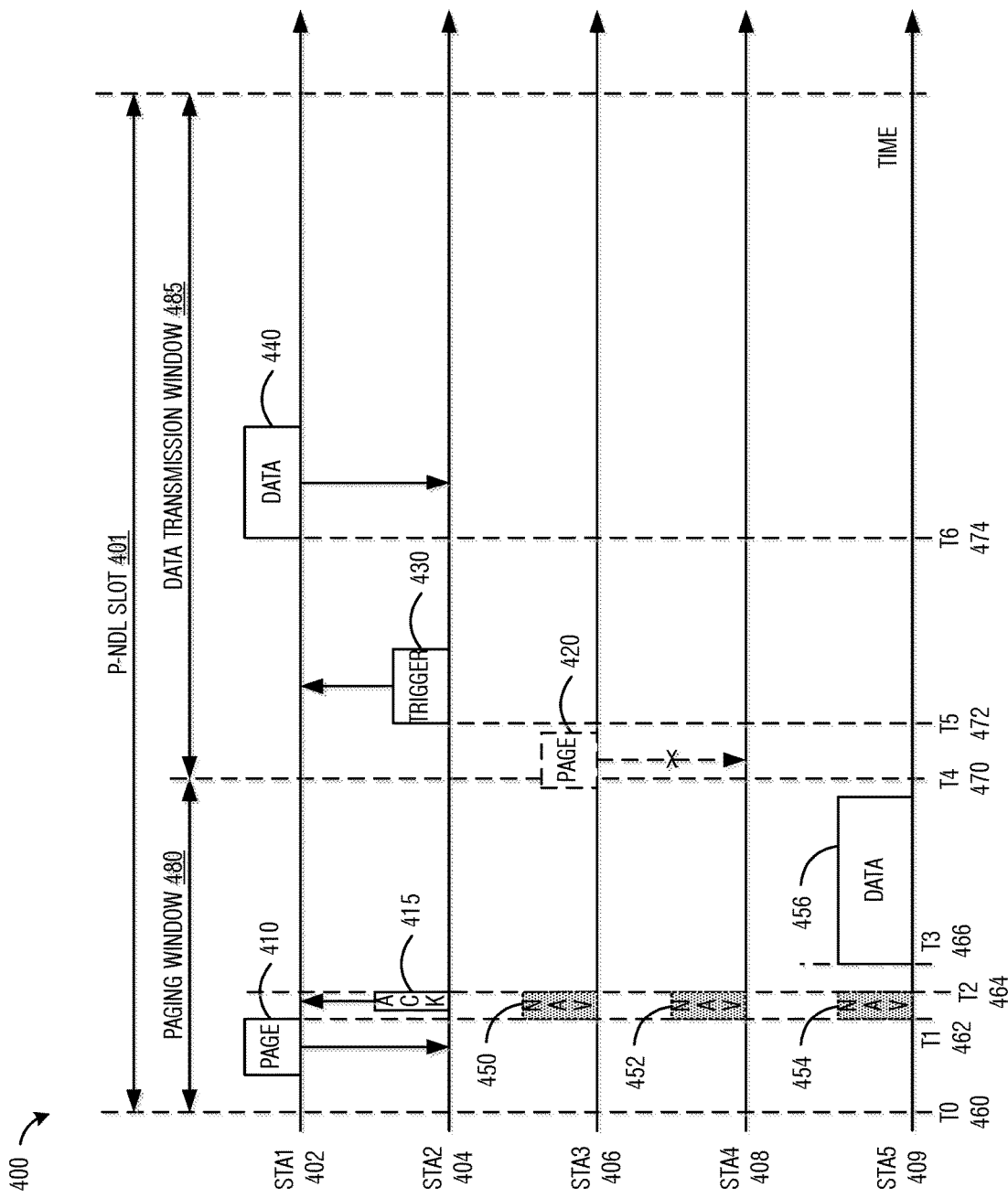
FIG. 4 illustrates example operations occurring during a P-NDL Slot highlighting a data transmission by a non-NAN2 Wi-Fi device taking up a large portion of a paging window.

FIG. 4 illustrates example operations 400 occurring during a P-NDL Slot 401 highlighting a data transmission by a non-NAN2 Wi-Fi device taking up a large portion of a paging window. Operations 400 may be indicative of operations occurring in one or more STAs as the STAs participate in direct STA-to-STA communications. Operations 400 includes interactions between STA1 402, STA2 404, STA3 406, STA4 408, and STA5 409, where STA1 402, STA2 404, STA3 406, and STA4 408 are NAN2 stations, while STA5 409 is a non-NAN2 Wi-Fi device.

A paging window 480 starts at time T0 460. STA1 402, STA3 406, and STA5 409 contend for the channel with STA1 402 obtaining the channel and transmitting page 410 to STA2 404. Page 410 includes a Duration field that contains a value equal to the end of the expected ACK frame 415 (i.e., time T2 464) minus the end of page 410 (i.e., time T1 462). At time T1 462, the NAV of the other stations (e.g., NAV 450 for STA3 406, NAV 452 for STA4 408, and NAV 454 for STA5 409) are initialized to the value contained in the Duration field in page 410 and are counted down at a uniform rate. The NAV of the other stations clear (i.e., become zero) at time T2 464. Thus, virtual CS functions of the other stations indicate that the channel is idle. Since there is no transmission after T2 464, presumably, the physical CS functions of the other stations also indicate that the channel is idle. A DIFS period later, STA3 406, STA4 408, and STA5 409 resume counting down their backoff timers, respectively. STA5 409 initially loses channel contention to STA1 402. STA5 409 wins channel contention (e.g., over STA3 406) and transmits data 456 at time T3 466. Data 456 is so large that the majority of what remains of paging window 480 is occupied by data 456. The transmission of data 456 prevents the other stations from transmitting, including the NAN2 stations from sending page messages. As an example, STA3 406 intends to page STA4 408 with page 420 but is unable to do so before the ending of paging window 480 at time T4 470 due to data 456. Therefore, in data transmission window 485, the only NAN2 transmissions consist of a trigger 430 and data 440 between STA2 404 and STA1 402. The remainder of data transmission window 485 is free of NAN2 transmissions, resulting in an under-utilized data transmission window, which was allocated purposefully for NAN2 transmissions.

According to an example embodiment, a NAN2 device transmitting in a paging window delays access of non-NAN2 Wi-Fi devices to the channel, thereby offering a competitive advantage to other NAN2 devices with transmissions that can take place in the paging window. As an example, a NAN2 device transmits a page message delays the access of non-NAN2 Wi-Fi devices to the channel during the paging window by extending the value of the Duration field in the MAC header of the page message. The extended value in the Duration field covers an extra time period (DURATION_Extension) beyond what is necessary for completing the page message exchange, including the page message and optionally an ACK frame and a SIFS in between. DURATION_Extension may be a standardized value specified in a technical standard or by an operator of the communications system, or determined by the data source device and indicated in the page message (enabling dynamic management of DURATION_Extension) or in a NAN2 data group management frame (offering a more static management of DURATION_Extension). The NAN2 devices receiving the page message may make necessary adjustments before or after applying the received value in the Duration field to their respective NAV. Non-NAN2 Wi-Fi devices, being unable to understand the page message, do not make any adjustments before or after applying the received value in the Duration field to their respective NAV, thus become disadvantaged when competing with the NAN2 devices for the channel.

As an illustrative example, in a multicast page message, the value in the Duration field is set to DURATION_Extension, instead of 0. In a unicast page message, the value in the Duration field is set to a sum of durations of an ACK frame, a SIFS, and DURATION_Extension, instead of a sum of durations of an ACK frame and a SIFS.

Figure 5:
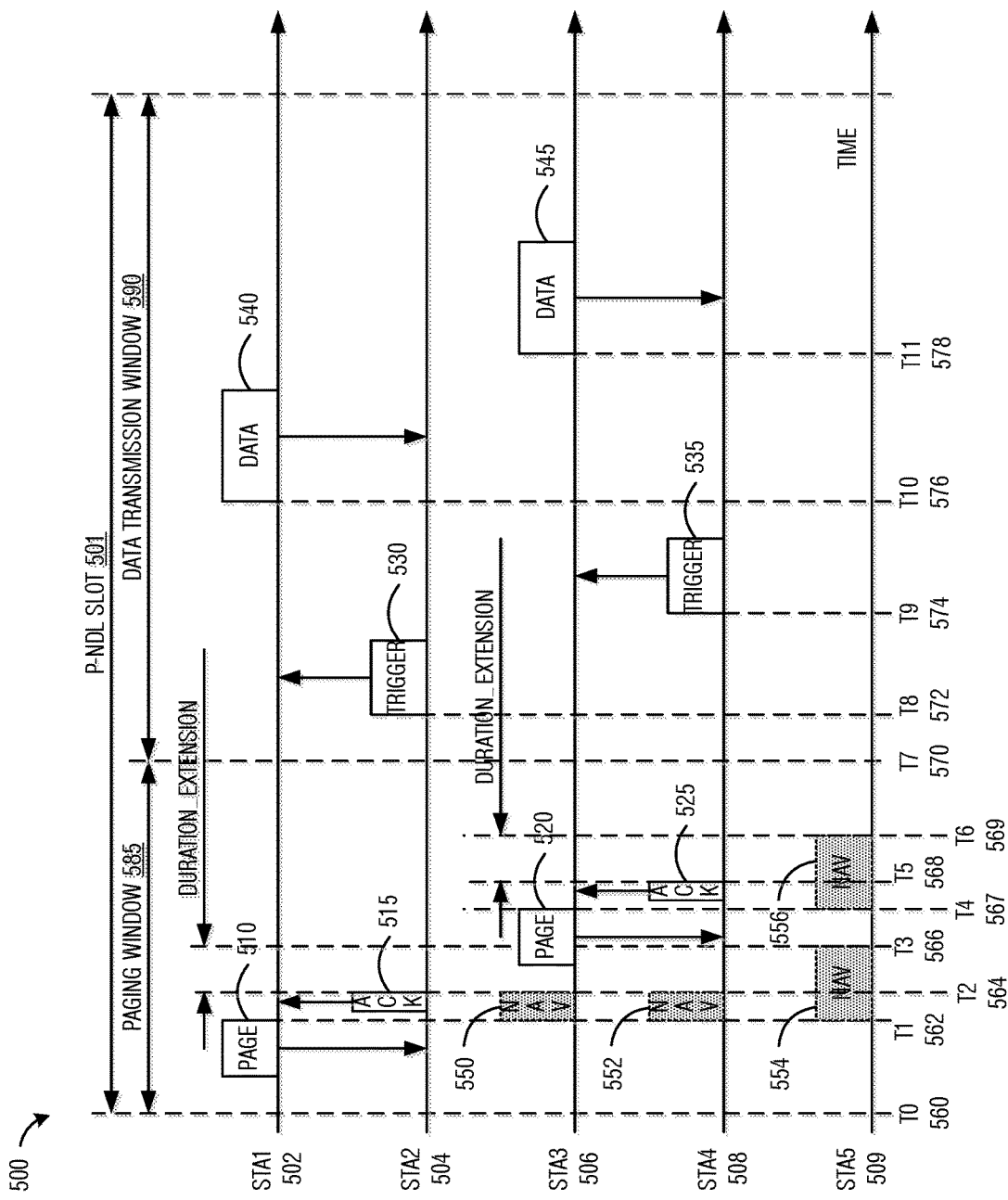
FIG. 5 illustrates example operations occurring during a P-NDL Slot highlighting how the extension of the value in the Duration field of a page message offers advantages to NAN2 devices in the paging window according to embodiments presented herein.

FIG. 5 illustrates example operations 500 occurring during a P-NDL Slot 501 highlighting how the extension of the value in the Duration field of a page message offers advantages to NAN2 devices in the paging window. Operations 500 includes interactions between STA1 502, STA2 504, STA3 506, STA4 508, and STA5 509, where STA1 502, STA2 504, STA3 506, and STA4 508 are NAN2 stations, while STA5 509 is a non-NAN2 Wi-Fi device.

A paging window 585 starts at time T0 560. STA1 502, STA3 506, and STA5 509 contend for the channel with STA1 502 obtaining the channel and transmitting page 510 to STA2 504. The Duration field of page 510 includes a value that is extended by DURATION_Extension beyond what is necessary to complete page 510 and an ACK frame (ACK 515). At time T1 562, the NAVs of the other stations (e.g., NAV 550 for STA3 506, NAV 552 for STA4 508, and NAV 554 for STA5 509) are initialized to the value contained in the Duration field in page 510. However, since STA5 509 is a non-NAN2 Wi-Fi device, STA5 509 is not capable of understanding the page message and does not make an adjustment to the value in its NAV when counting down its NAV, while STA3 506 and STA4 508 do understand the page message and do make adjustments to the values in their respective NAVs by subtracting DURATION_Extension from them. Therefore, the NAVs of the respective stations are different. As shown in FIG. 5, the NAVs of STA3 506 (NAV 550) and STA4 508 (NAV 552) clear at time T2 564 while the NAV of STA5 509 (NAV 554) does not clear until time T3 566.

Therefore, only STA3 506 resumes contending for the channel a DIFS after time T2 564 by resuming counting down its backoff timer, which was suspended at the beginning of page 510. At this time, STA5 509's NAV has a non-zero value, indicating the channel is busy to STA5 509. Therefore, STA5 509 can't resume counting down its backoff timer, which was also suspended at the beginning of page 510. Therefore, STA3 506 has a competitive advantage over STA5 509. STA3 506 obtains the channel and sends page 520. The Duration field of page 520 also includes a value that is extended by DURATION_Extension, resulting in STA5 509 updating its NAV counter value to the new Duration value in page 520, shown as NAV 556. After STA3 506 transmits page 520, if there are more NAN2 stations having a page message to send during paging window 585, they will also have a competitive advantage over STA5 509 in a similar manner as described above. STA5 509 will be able to access the channel during the remainder of paging window 585 only if there are no more NAN2 stations having a page message to send, at which point the harm that a data transmission of STA5 509 can do to the pending NAN2 data transmissions in the data transmission window 590 is limited to at most the length of the data transmission of STA5 509. The rest of the data transmission window 590 can still be occupied by NAN2 data transmissions, of which a page message has been sent successfully before the data transmission of STA5 509. Therefore, even if the data transmission of STA5 509 extends into data transmission window 590, the NAN2 data transmissions corresponding to successfully sent page message(s) occurring in paging window 585 prior to the data transmission of STA 509 will be transmitted in data transmission window 590. Data transmission window 590 begins at time T7 570 and NAN2 transmissions occurring in data transmission window 590 include trigger 530, trigger 535, data 540, and data 545. Again, the ACK frames sent to acknowledge trigger 530, trigger 535, data 540, and data 545, respectively, are omitted in FIG. 5 to maintain simplicity.

According to an example embodiment, a NAN2 data sink device sends an ACK frame (such as ACK frames 515 and 525 of FIG. 5) to a unicast page message. The ACK frame includes a Duration field with a value set to the value of the Duration field of the unicast page message minus a sum of durations of the ACK frame and a SIFS. The modification to the value of the Duration field is consistent with current conventions for setting the Duration field in a frame that is sent in response to another frame. Thus, the value of the Duration field in the ACK frame is also extended, e.g., by DURATION_Extension. The extended value of the Duration field in the MAC header of the ACK frame may help to set the NAV of other non-NAN2 Wi-Fi devices that are in the proximity. It is noted that if the page message is a multicast page message, no ACK frame is necessary.

According to an example embodiment, the extended value in the Duration field in the MAC header of the page message is used to set the NAV of non-NAN2 Wi-Fi devices so that they are prohibited from attempting to access the channel for the extended timer period.

According to an example embodiment, all NAN2 devices of the NAN group initially set their respective NAVs using the extended value in the Duration field in the MAC header of the page message. However, after a higher layer function recognizes the frame carries a Paging Attribute (i.e., the frame is recognized as a page message), e.g., based on a frame type of the frame, an indicator included in the frame, or an attribute identifier of the Paging Attribute, the higher layer function instructs that the NAV be reduced by the amount equal to DURATION_Extension. The NAVs in the NAN2 devices of the NAN group will reach zero earlier than the NAVs of the non-NAN2 Wi-Fi devices, offering the NAN2 devices the competitive advantage over the non-NAN2 Wi-Fi devices when it comes to contending for the channel. Within a single NAN group, it is assumed that all NAN2 devices can receive the page message and if the page message is a unicast page message, the ACK frame is sent in response. All other NAN2 devices treat the value in the Duration field of the ACK frame received immediately after a page message in the same manner as the value in the Duration field of the page message, i.e., they will make similar adjustments.

According to an example embodiment, extending the Duration field in the MAC header by DURATION_extension may not be applied to all NAN2 frames. For example, extending the Duration field in the MAC header by the DURATION_extension may be applied only to NAN2 frames with a management frame type or a data frame type, but not with a control frame type. According to another example embodiment, extending the Duration field in the MAC header by DURATION_extension may be applied only to certain NAN2 frames with certain functions such as the frame carrying a page message or an ACK frame responding to a page message. According to yet another example embodiment, extending the Duration field in the MAC header by DURATION_extension may be applied only when it is explicitly indicated.

According to an example embodiment, the Paging Attribute for unicast data is modified. The Paging Attribute for unicast data is modified to include a DURATION_Extension field. In a first option, a 1 octet DURATION_Extension is provided, with a 1 bit indicator indicating if the extension value is included or not and a 7-bit value indicating the extension value in a pre-specified unit, e.g., aSlotTime, where aSlotTime is 9 usec. In a second option, a 1 octet DURATION_Extension is provided with a value "0" indicating that the value of the Duration field is not extended, while values "1" to "255" indicate the extension value in a pre-specified unit, e.g., aSlotTime. In order to ensure that other NAN2 devices read such as a page message, the page message may be sent as a multicast page message, i.e., the receiver address (RA) field, also known as the Address 1 field, in the MAC header of the frame carrying the page message contains a multicast MAC address, even if the Paging Attribute included in the frame is a Paging Attribute for unicast data. FIG. 6 illustrates a table 600 detailing modifications to the Paging Attribute for unicast data.

According to an example embodiment, the Paging Attribute for multicast data is modified. The Paging Attribute for multicast data is modified to include a DURATION_Extension field. In a first option, a 1 octet DURATION_Extension is provided, with a 1 bit indicator indicating if the extension value is included or not and a 7-bit value indicating the extension value in a pre-specified unit, e.g., aSlotTime, where aSlotTime is 9 usec. In a second option, a 1 octet DURATION_Extension is provided with a value "0" indicating that the value of the Duration field is not extended, while values "1" to "255" indicate the extension value in a pre-specified unit, e.g., aSlotTime. The RA field in the MAC header of the frame carrying the Paging Attribute for multicast data contains a multicast MAC address of the multicast data group. FIG. 7 illustrates a table 700 detailing modifications to the Paging Attribute for multicast data.

According to an example embodiment, a NAN2 device transmitting in a channel delays access of non-NAN2 Wi-Fi devices to the channel, thereby offering a competitive advantage to other NAN2 devices with transmissions. As an example, a NAN2 device extends the value of the Duration field in MAC header of a NAN2 transmission. As an illustrative example, the NAN2 device extends the value of the Duration field in the MAC header of NAN2 data frames sent during a data transmission window or during S-NDL Time slots, wherein the extended value covers an extra time (DURATION_Extension) beyond the time necessary for completing the NAN2 data frame exchange, including the NAN2 data frame, and optionally an ACK frame (corresponding to the NAN2 data frame) and a SIFS in between. The DURATION_Extension value may be:

Specified by a technical standard;
An operator of the communications system;
Semi-statically configured and indicated using a NAN2 management frame, which is used to manage the parameters used within the NAN2 data group; or
Dynamically set and indicated (by the sender of the NAN2 transmission) using Reserved bits in the QoS Control field or High Throughput control (HTC) field in the MAC header of the NAN2 data frame.

NAN2 devices receiving the NAN2 data frames with the extended value in the Duration field adjusts their NAVs by the amount of DURATION_Extension. Non-NAN2 Wi-Fi devices do not understand the NAN2 data frames and leave the extended value in their NAVs unadjusted, thereby delaying their channel contention.

Figure 8:
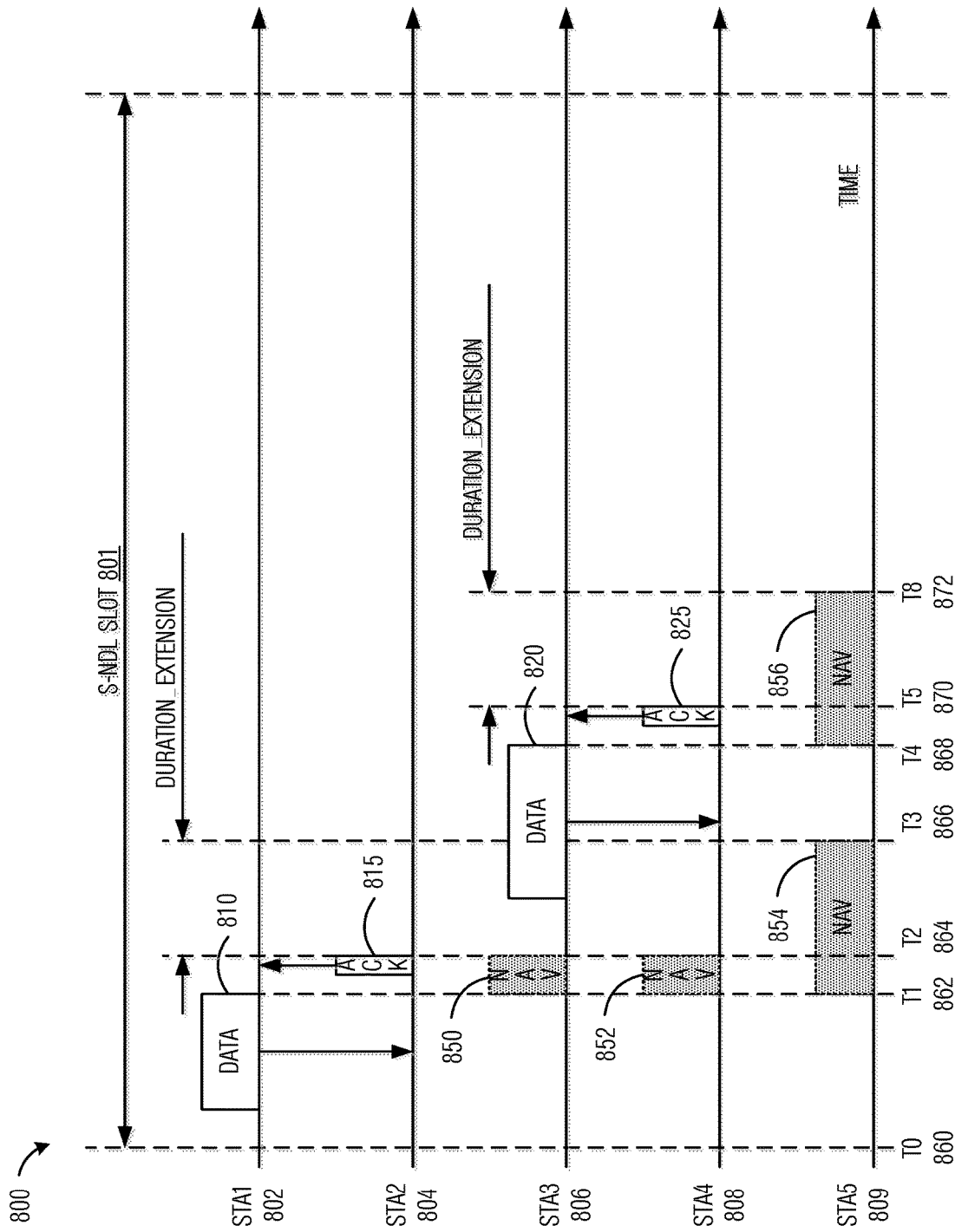
FIG. 8 illustrates example operations occurring in an S-NDL slot according to embodiments presented herein.

FIG. 8 illustrates example operations 800 occurring in an S-NDL slot 801. Operations 800 includes interactions between STA1 802, STA2 804, STA3 806, STA4 808, and STA5 809, where STA1 802, STA2 804, STA3 806, and STA4 808 are NAN2 stations, while STA5 809 is a non-NAN2 Wi-Fi device.

Starting at time T0 860, STA1 802, STA3 806, and STA5 809 contend for the channel. STA1 802 obtains the channel and sends a NAN2 data frame 810 with an extended value in the Duration field to STA2 804, which responds with ACK frame 815 that also includes an extended value in the Duration field (the values in the respective Duration fields are different but covering up to the same point of time when the NAVs of the other stations, which were set by the other stations in accordance with either of these two Duration fields, should clear). STA3 806, STA4 808, and STA5 809 set their NAVs to the extended value in the Duration field of either NAN2 data frame 810 or ACK frame 815. However, since STA3 806 and STA4 808 are NAN2 devices, they know to adjust their NAVs by the amount of DURATION_Extension. Because STA5 809 is a non-NAN2 Wi-Fi device, STA5 809 does not know to adjust its NAV by the amount of DURATION_Extension. Therefore, the NAV of STA5 809 (shown as NAV 854) clears at a later time (T3 866). The adjusting of the NAVs gives the competitive advantage to the NAN2 stations. STA3 806 is able to obtain the channel and sends a NAN2 data frame 820 with an extended value in the Duration field to STA4 808, which responds with ACK frame 825 that also includes an extended value in the Duration field (the values in the respective Duration fields are different but covering up to the same point of time when the NAVs of the other stations, which were set by the other stations in accordance with either of these two Duration fields, should clear). As shown in FIG. 8, STA5 809 sets its NAV (shown as NAV 856) to the extended value in the Duration field of either NAN2 data frame 820 or ACK frame 825, without adjustment.

According to an example embodiment, in a communications system with different groups of devices contending for access to a shared channel, wherein at least a first group of devices operating on a sequence of time slots (e.g., for low power operations), extended values, which extend the periods during which the shared channel is considered busy, are used to delay or de-prioritize a second group of devices from contending for access to the shared channel during a time slot that is scheduled for communications among devices in the first group of devices. As an illustrative example, the devices in the first group of devices uses a message transmitted during a scheduled time slot to overly claim a duration of the transmission (as well as optionally claim a duration for a response message and a short interval). The devices in the first group of devices receiving such a message adjusts their respective understanding of the duration of the transmission (e.g., by subtracting) the amount to determine when the shared channel will once again be idle. The devices in the second group of devices, which may not be fully compatible with the devices in the first group of devices, do not make such adjustments and are therefore disadvantaged with respect to contending for access to the shared channel. Due to the adjustment (or lack thereof) to an expected time when the shared channel will become idle, the devices in the first group of devices resume their attempts to contend for the shared channel but the devices in the second group of devices will not (until a later time when the extended period has also elapsed), thus providing the devices in the first group of devices priority over the devices in the second group of devices.

An excessively large value for the DURATION_Extension may be too unfair to the non-NAN2 Wi-Fi devices or may cause the channel to be idle for too long after there are no more page messages in the paging window or no more NAN2 data messages in the data transmission window or S-NDL Time Slots. Therefore, there is a need to balance the need to protect the NAN2 time windows and the need to maintain fairness and channel utilization. As an illustrative example, the value for the DURATION_Extension may be adjusted based on the current congestion condition in the channel. An example measure reflecting the congestion condition is the Contention Window (CW) size currently being used. However, the CW may be too dynamic and it also depends upon the AC of the buffered data. Alternatively, a NAN2 device in a group management role may configure the value for the DURATION_Extension for the group, based on a measurement of the channel congestion condition, for example.

Figure 9:
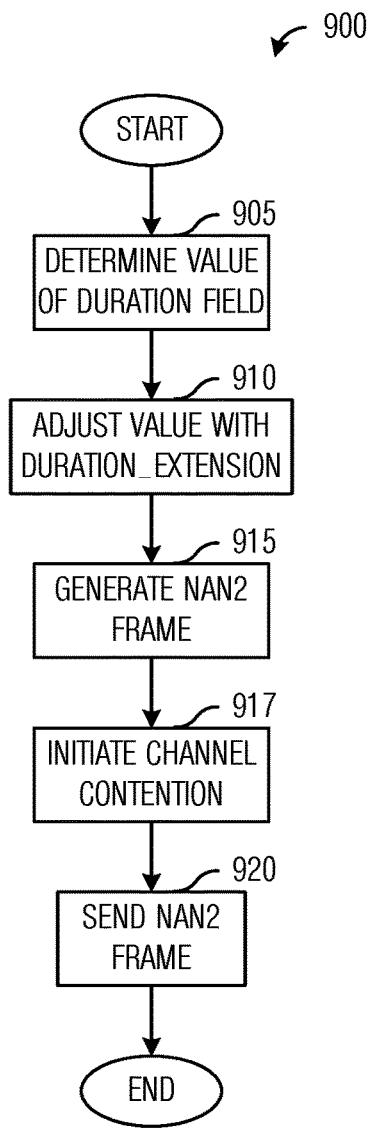
FIG. 9 illustrates a flow diagram of example operations occurring in a NAN2 device as the NAN2 device prioritizes NAN2 devices over non-NAN2 devices according to embodiments presented herein.

FIG. 9 illustrates a flow diagram of example operations 900 occurring in a NAN2 device as the NAN2 device prioritizes NAN2 devices over non-NAN2 devices. Operations 900 may be indicative of operations occurring in a NAN2 device as the NAN2 device prioritizes NAN2 devices over non-NAN2 devices. Although the discussion focuses on NAN2 and non-NAN2 devices, the example embodiments presented herein are operable with other types of devices. In general, a device belonging to a first group of devices can prioritize members of the first group of devices over devices in a second group of devices.

Operations 900 begin with the NAN2 device determining a value of a Duration field of a NAN2 transmission (block 905). As an illustrative example, the value may be equal to a sum of a duration of a frame exchange including a NAN2 frame, and optionally including a response frame responding to the NAN2 frame and any specified gap periods. The NAN2 device adjusts the value of the Duration field with an extended value (block 910). The extended value may be specified by a technical standard, or an operator of the communications system. Alternatively, the NAN2 device may determine the extended value. Alternatively, the extended value may be set by a management device and signaled to the NAN2 device. The NAN2 device generates the NAN2 frame (block 915) and initiates a channel contention procedure in order to access the channel for sending the NAN2 frame (block 917). The NAN2 device wins the channel contention and sends the NAN2 frame (block 920).

Figure 10:
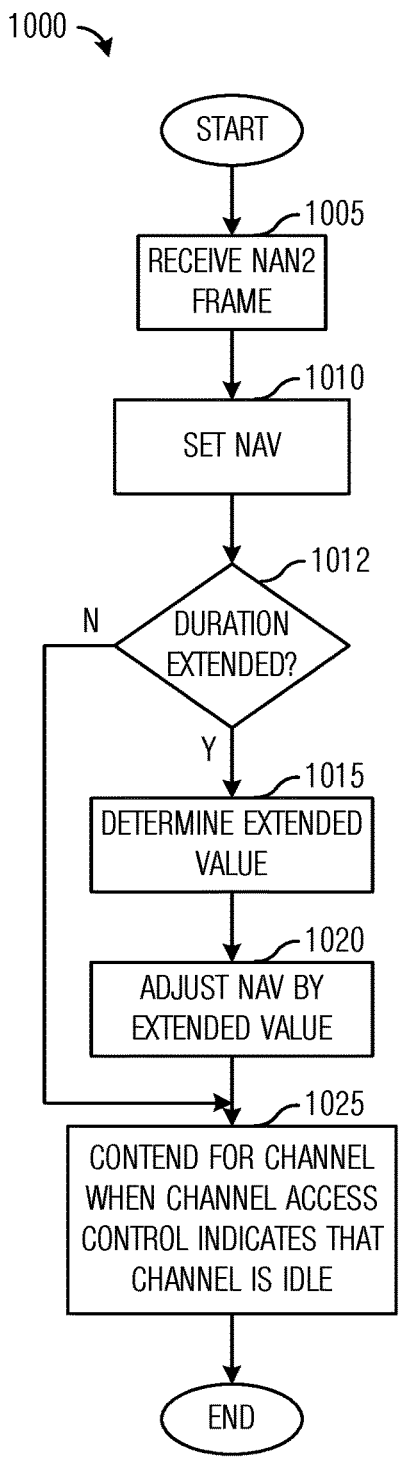
FIG. 10 illustrates a flow diagram of example operations occurring in a NAN2 device as the NAN2 device is prioritized over non-NAN2 devices according to embodiments presented herein.

FIG. 10 illustrates a flow diagram of example operations 1000 occurring in a NAN2 device as the NAN2 device is prioritized over non-NAN2 devices. Operations 1000 may be indicative of operations occurring in a NAN2 device that is prioritized over non-NAN2 devices. Although the discussion focuses on NAN2 and non-NAN2 devices, the example embodiments presented herein are operable with other types of devices. In general, a device belonging to a first group of devices can be prioritized over devices in a second group of devices.

Operations 1000 begin with the NAN2 device receiving a NAN2 frame (block 1005). The NAN2 device sets the NAV in accordance with the value of the Duration field in the NAN2 frame (block 1010). The NAN2 device determines if the value of the Duration field has been extended (block 1012). For example, the NAN2 device may determine if an indication is present in the NAN2 frame indicating that the value of the Duration field in the NAN2 frame has been extended. For another example, the NAN2 device may determine if a field indicating the extended value is present in the NAN2 frame. For yet another example, the NAN2 device may determine if a frame type of the NAN2 frame implies that a pre-specified extended value is applied to the Duration field in the NAN2 frame. If the NAN2 device determines that the value of the Duration field has been extended in block 1012, the NAN2 device determines the extended value (block 1015). As an example, the NAN2 device may determine that the extended value is a pre-specified value. As another example, the NAN2 device may determine the extended value from a memory resulted from a previously received management frame. As yet another example, the NAN2 device may determine the extended value from a field included in the NAN2 frame. The NAN2 device adjusts (i.e., subtracts) its NAV by the extended value (block 1020). If the NAN2 device determines that the value of the Duration field in the NAN2 frame hasn't been extended in block 1012 or after the NAN2 modified its NAV in block 1020, the NAN2 device contends for the channel when a channel access control indicates that the channel is idle (block 1025). As discussed previously, in Wi-Fi systems the channel access control is implementing as physical and virtual carrier sensing (CS) functions. Hence, in a Wi-Fi system, the channel is idle when the NAV (the virtual CS function) becomes zero and the physical CS function, which is based on energy detection, also indicates an idle channel.

Figure 11:
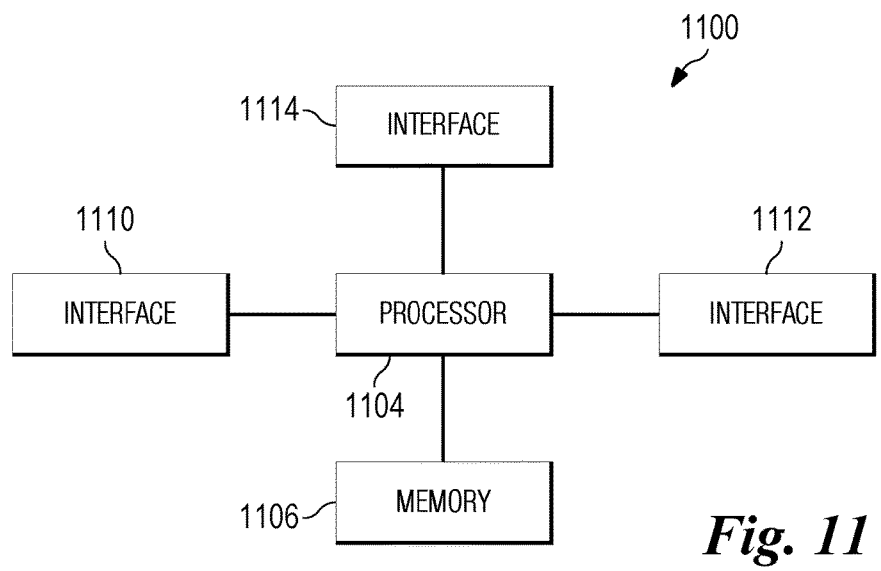
FIG. 11 illustrates a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless telecommunications network, such as an access point, a base station, a relay station, a scheduler, a controller, a gateway, a router, an applications server, or any other device in the telecommunications network. In other embodiments, the processing system 1100 is in a user-side device accessing a wireless telecommunications network, such as a mobile station, a user equipment (UE), a personal computer (PC), a tablet, a wearable communications device (e.g., a smartwatch, etc.), or any other device adapted to access a telecommunications network.

Figure 12:
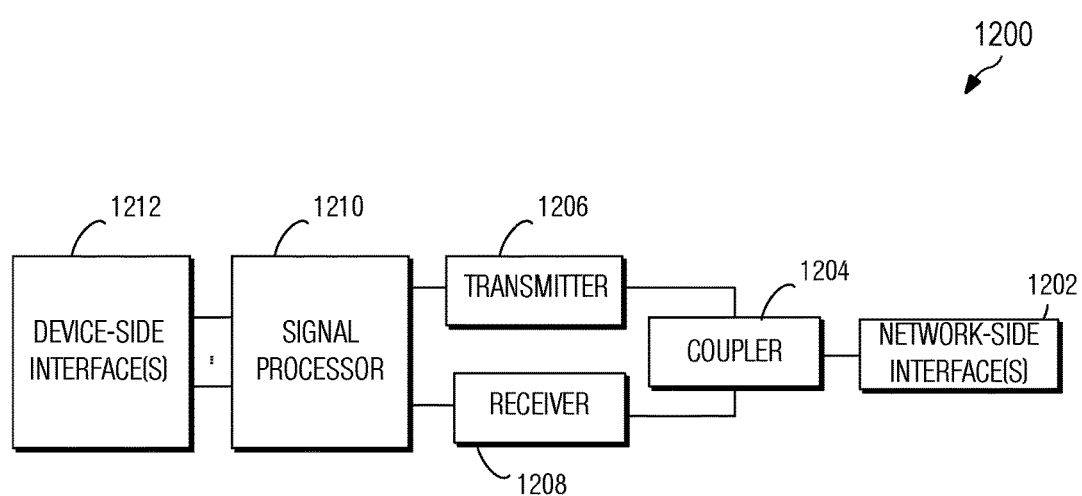
FIG. 12 illustrates a block diagram of a transceiver adapted to transmit and receive signaling over a telecommunications network according to embodiments presented herein.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE) Direct, LTE unlicensed (LTE-U), Licensed Assisted Access (LAA), etc.), a Wi-Fi protocol (e.g., wireless local area network (WLAN), Wi-Fi Direct, NAN, NAN2, etc.), or any other type of wireless protocol (e.g., Bluetooth, ZigBee, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. Specific processing systems and/or transceivers may utilize all of the components shown, or only a subset of the components, and levels of integration may vary from device to device.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for prioritizing first group devices over second group devices in accessing a channel during a time slot scheduled for communications by the first group devices, the method comprising:
   generating, by a first group device of the first group devices, a frame comprising a Duration field containing a value set to a sum of a duration of a frame exchange including a transmission of the frame and a duration of a time extension; and
   transmitting, by the first group device, the frame in the time slot.

2. The method of claim 1, wherein the duration of the time extension is determined by the first group device.

3. The method of claim 2, further comprising, signaling, by the first group device, the duration of the time extension.

4. The method of claim 1, further comprising, receiving, by the first group device, the duration of the time extension.

5. The method of claim 1, wherein the first group devices are compliant with Wi-Fi Alliance Neighbor Awareness Networking (NAN) specification, and wherein the second group devices are compliant with IEEE 802.11 standard.

6. The method of claim 5, wherein the frame is a NAN action frame with a paging attribute, and wherein the time slot is a paging window.

7. The method of claim 5, wherein the frame is NAN data frame, and wherein the time slot is one of a data transmission window or a synchronized NAN data link (S-NDL) time slot.

8. The method of claim 1, wherein the first group devices and the second group devices are communications devices that access the channel by contending for the channel, and wherein prioritizing the first group devices over the second group devices in accessing the channel during the time slot enables the first group devices to operate in a power saving mode outside the time slot for a duration greater than without prioritizing the first group devices over the second group devices.

9. A method for accessing a channel for communicating in a time slot, the method comprising:
   receiving, by a first device, a frame in the time slot, the frame comprising a Duration field containing a value set to a sum of a duration of a frame exchange including a transmission of the frame and a duration of a time extension;
   updating, by the first device, a first network allocation vector (NAV) in accordance with the value of the Duration field and the duration of the time extension; and
   contending, by the first device, for access to the channel when a channel access control indicates that the channel is idle.

10. The method of claim 9, wherein updating the first NAV comprises setting the first NAV to the value of the Duration field and subtracting the duration of the time extension from the first NAV.

11. The method of claim 9, wherein updating the first NAV comprises adjusting the value of the Duration field by subtracting the duration of the time extension and setting the first NAV to the adjusted value.

12. The method of claim 9, further comprising, receiving, by the first device, the duration of the time extension.

13. The method of claim 9, wherein the first device is compliant with Wi-Fi Alliance Neighbor Awareness Networking (NAN) specification.

14. The method of claim 13, wherein the frame is a NAN action frame with a paging attribute, and wherein the time slot is a paging window.

15. The method of claim 13, wherein the frame is a NAN data frame, and wherein the time slot is one of a data transmission window or a synchronized NAN data link (S-NDL) time slot.

16. The method of claim 9, wherein the first device and a second device are communications devices that access the channel by contending for the channel, wherein updating the first NAV in accordance with the value of the Duration field and the duration of the time extension comprises subtracting the duration of the time extension, wherein the subtracting prioritizes the first device over the second device for accessing the channel during the time slot, wherein a second NAV of the second device is updated in accordance with the value of the Duration field without subtracting the duration of the time extension.

17. The method of claim 16, wherein prioritizing the first device over the second device in accessing the channel during the time slot enables the first device to operate in a power saving mode outside the time slot for a duration greater than without prioritizing the first device over the second device.

18. A first group device adapted to prioritize first group devices over second group devices in accessing a channel, the first group device comprising:
   a processor; and
   a computer readable storage medium storing programming for execution by the processor, the programming including instructions to configure the first group device to:
      generate a frame comprising a Duration field containing a value set to a sum of a duration of a frame exchange including a transmission of the frame and a duration of a time extension, and
      transmit the frame in a time slot.

19. The first group device of claim 18, wherein the programming includes instructions to configure the first group device to receive the duration of the time extension.

20. The first group device of claim 18, wherein the programming includes instructions to configure the first group device to signal the duration of the time extension.

21. The first group device of claim 18, wherein the first group devices are compliant with Wi-Fi Alliance Neighbor Awareness Networking (NAN) specification, and wherein the second group devices are compliant with IEEE 802.11 standard.

22. A device adapted to access a channel for communicating in a time slot, the device comprising:
   a processor; and
   a computer readable storage medium storing programming for execution by the processor, the programming including instructions to configure the device to:
      receive a frame in the time slot, the frame comprising a Duration field containing a value set to a sum of a duration of a frame exchange including a transmission of the frame and a duration of a time extension, update a network allocation vector (NAV) in accordance with the value of the Duration field and the duration of the time extension, and
contend for access to the channel when a channel access control indicates that the channel is idle.

23. The device of claim 22, wherein the programming includes instructions to configure the device to set the NAV to the value of the Duration field and subtract the duration of the time extension from the NAV.

24. The device of claim 22, wherein the programming includes instructions to configure the device to adjust the value of the Duration field by subtracting the duration of the time extension and set the NAV to the adjusted value.

25. The device of claim 22, wherein the programming includes instructions to configure the device to receive the duration of the time extension.

26. The device of claim 22, wherein the device is compliant with Wi-Fi Alliance Neighbor Awareness Networking (NAN) specification.

* * * * *